United States Patent
Mitsui et al.

[15] 3,657,728

[45] Apr. 18, 1972

[54] INTERCONNECTING APPARATUS WITH IMPEDANCE INSERTION MEANS FOR ELECTRIC POWER SYSTEMS

[72] Inventors: Tsuneo Mitsui, Tokyo; Keizo Nakayam, Hitachi-shi; Tetsuo Kobayashi, Mito-shi; Kenzo Okuda, Hitachi-shi, all of Japan

[73] Assignees: The Tokyo Electric Power Co., Inc.; Hitachi, Ltd., Tokyo, Japan

[22] Filed: Aug. 7, 1969

[21] Appl. No.: 848,314

[30] Foreign Application Priority Data

Aug. 14, 1968 Japan.................................43/57330

[52] U.S. Cl.............................307/20, 317/20, 323/9
[51] Int. Cl..........................................H02j 1/10
[58] Field of Search.............317/26, 16, 20, 44; 307/77, 307/71, 88, 43, 63, 69, 72, 76, 19, 20, 64, 70, 80, 51–60; 323/70, 82, 101, 102, 105, 121, 127, 129, 43.5, 62, 9

[56] References Cited

UNITED STATES PATENTS

| | | | |
|---|---|---|---|
| 1,696,177 | 12/1928 | Evans | 323/9 |
| 1,939,145 | 12/1933 | Sittinger | 307/20 X |
| 1,961,801 | 6/1934 | Palley | 323/43.5 |
| 3,436,600 | 4/1969 | Salo | 323/9 X |
| 1,821,935 | 9/1931 | Finch | 307/51 |

FOREIGN PATENTS OR APPLICATIONS 431,949  7/1935  Great Britain...........................307/20

*Primary Examiner*—Laramie E. Askin
*Assistant Examiner*—U. Weldon
*Attorney*—Craig, Antonelli & Hill

[57] ABSTRACT

An interconnecting apparatus for electric power systems wherein two electric power systems are connected to each other with a series transformer and the secondary winding of the series transformer is energized with a compensating voltage whose value and polarity are such that it cancels the voltage drop developed across said transformer when said electric power systems are normally operating. The compensating voltage is derived from the secondary winding of an exciting transformer inserted between the central point of the series transformer and the earth. The secondary winding of the series transformer is connected in delta and the secondary winding of the exciting transformer is star-connected. If it is necessary, the exciting transformer may be provided with a tertiary winding to control the voltages of the respective power systems by the voltage of this tertiary winding.

10 Claims, 14 Drawing Figures

Patented April 18, 1972

INVENTORS
TSUNEO MITSUI, KEIZO NAKAYAMA,
TETSUO KOBAYASHI and KENZO KUDA

BY Craig, Antonelli, Stewart & Hill

ATTORNEYS

INVENTORS
TSUNEO MITSUI, KEIZO NAKAYAMA
TETSUO KOBAYASHI and KENZO KUDA

BY Craig, Antonelli, Stewart & Hill
ATTORNEYS

INTERCONNECTING APPARATUS WITH IMPEDANCE INSERTION MEANS FOR ELECTRIC POWER SYSTEMS

The scale of power systems continues to grow as the demand for electric power increases. The increasing scale of power systems has made it possible to realize considerable economic advantages such as a reduction in the electric power reserve capacity and the like, if all the systems are adapted such that a parallel operation is possible. However, if any fault occurs in a power system, an extremely large fault or surge current will flow through the systems, thus necessitating large capacity circuit breakers. There will be various other drawbacks from the reliability aspect of the electric power supply, since a fault on the system may, for example, involve the danger that it may spread throughout all the systems, causing a general failure of the power supply.

Thus, instead of constructing a single large scale electric power system, the system may be divided into several blocks which will be in turn connected with one another by means of suitable interconnecting means. And it is desirable that when there is no fault, these block systems may be operated as if they constituted a single electric power system; should a fault occur in any one of the block systems, not only should the fault current be instantaneously limited, but also the fault must be prevented from spreading over the remaining sound block systems, thereby providing a system wherein there are no drawbacks from the aspect of power supply reliability and which at the same time, enjoys the merits of a large-scale power system. Therefore, any interconnecting apparatus used must fulfil the following functions:

1. That it permits the electric power accommodation at all times.

For instance, consider two block systems connected to each other through an interconnecting apparatus. The balance of demand and supply for each of the block systems may not necessarily be maintained even under normal conditions and it will thus be necessary that power is exchanged between the two block systems. The interconnecting apparatus used should not be an obstacle to such an accommodation of power.

2. That it is capable of limiting short-circuit capacity.

If a fault occurs in one block system, for example, it will be necessary to reduce the fault current which will flow in from the other sound block system to a low level in order to limit the fault current at the point where it took place. This is effective in reducing the inductive disturbances caused by the fault current and reducing the interrupting capacity required for circuit breakers.

3. That it is additionally capable of limiting the electric accommodation power.

For example, while it is necessary, when a fault has been removed from a block system on which it occurred, to permit again the free accommodation of electric power so that variations in frequency may be reduced even if the electric power source interruption or the like were caused by the fault and to thereby ensure a continued steady operation, the accommodation power flowing from the sound block system should be limited to ensure the steady operation of the sound block system when the electric power source interruption is so large that it is difficult to maintain the system frequency.

The object of the present invention is to provide a novel interconnecting apparatus which satisfies the above described requirements. The present invention has features as will be described hereunder.

Firstly, although the reactance of the interconnecting apparatus is always controlled to have an apparent value close to zero, essentially the reactance exists at all times so that its fault current limiting effect may take place at the instant a fault occurs.

Secondly, there is no possibility of any wave distortion or abnormal transient phenomena due to a fault current because the interconnecting apparatus does not include any non-linear elements such as a saturable reactor and a discharging gap.

Thirdly, by suitably adjusting the compensating voltage, a greater effectiveness may be achieved than would be expected from a simple impedance element.

Further features and effects will be apparent from the description of the preferred embodiments that will be made hereinafter.

Figure 1:
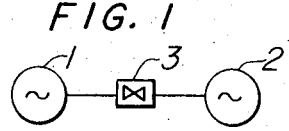
FIG. 1 is a single-line diagram for explaining the manner in which electric power systems are interconnected.

Referring to FIG. 1, numerals 1 and 2 designate block systems each comprising their own generators and loads and numeral 3 designates an interconnecting apparatus. These block systems will not be explained by way of examples, since it does not matter what system forms they may have. It is essential that should any unbalance occur between the generation of electric power and the load, the accommodation of power is made freely through the interconnecting apparatus 3 to meet the deficit with the surplus power. On the other hand, however, if a fault occurs in the block system 2, for example, the fault current from the block system 1 should preferably be limited to the lowest possible level by the interconnecting apparatus 3. It is more preferable if the interconnecting apparatus 3 performs the additional function to restrain the accommodation of power from the block system 1 so as to ensure the stabilized operation of the sound block system 1 and to reduce the system voltage of the block system 2. This will facilitate the demand-supply balancing in the block system 2, when the abrupt change of the power source in the block system 2, after the fault has been removed, is so large that an attempt to supply the deficiency entirely with the power from the block system 1 will make it difficult for both block systems to maintain their own system frequency with the strong likelihood of causing the entire system to collapse. According to the present invention, these functions may be realized separately or simultaneously as will be apparent from the description which is to be made hereinafter. Of course, the provision of the interconnecting apparatus 3 should in no way tend to cause any loss of stability of the entire system under normal conditions.

Figure 2:
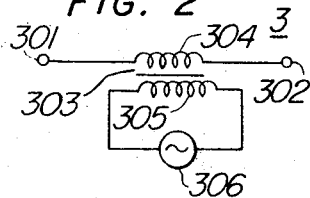
FIG. 2 is a connection diagram for explaining the principle of an interconnecting apparatus in accordance with the present invention.

FIG. 2 is an explanatory view of the principle of the present invention and shows the interconnecting apparatus designated at numeral 3 in FIG. 1. In the figure, numerals 301 and 302 designate terminals of the interconnecting apparatus; 303 a series transformer which forms the main constituent part of the interconnecting apparatus; 304 and 305, primary and secondary windings of the series transformers, respectively; 306 a compensating voltage source to energize the secondary winding 305. With the terminals 301 and 302 now being connected to the block systems 1 and 2 respectively and the leakage reactance in terms of the side of the primary winding 304 of the series transformer 302 being represented as X, the accommodation of electric power takes place in the direction towards the terminal 302 from the terminal 301, that is, from the block system 1 to the block system 2 and current I flows.

Figures 3A, 3B:
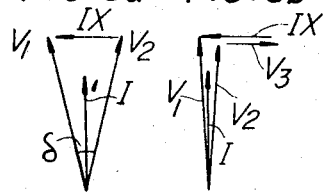
FIGS. 3a and 3b are vector diagrams for one phase to explain the effects of the compensating voltage according to the present invention.

The relationship between voltages $V_1$ and $V_2$ at the terminals 301 and 302 is as shown in FIGS. 3a and 3b. FIGS. 3a and 3b show vector diagrams for one phase in which FIG. 3a indicates the condition wherein the voltage (as designated at $V_3$) of the compensating voltage source 306 is zero ($V_3 = 0$). As is evident from the figure, a difference voltage is produced between the voltages $V_1$ and $V_2$ which corresponds to a voltage drop by the product (IX) of the leakage reactance X of the series transformer 303 and the current I, while at the same time a phase difference angle δ is produced between the voltages $V_1$ and $V_2$ of the two block systems 1 and 2. In other words, if the block systems 1 and 2 are interconnected with a series transformer 3, electric power is accommodated between the two systems which is determined by the distribution between the demand and generation of electric power. However, as the voltage phase difference angle δ between the voltages $V_1$ and $V_2$ of the two systems increases with the magnitude of the accommodation power, there is a limit for the value of the accommodation power where $V_3 = 0$. Contrary to this, FIG. 3b shows where a compensating voltage $V_3$ which is the quadrature component with respect to the voltages $V_1$ and $V_2$ (having the 90° phase difference) and whose value corresponds to IX is applied to the secondary winding 305 of the series transformer 303. As will be apparent from comparison between FIGS. 3a and 3b, if the compensating voltage $V_3$ of a proper magnitude is applied, it will seemingly be equivalent as if the two block systems are interconnected with an interconnecting impedance of a very small value so that the phase difference angle δ between the voltages of the block systems may be kept small even if a large electric power is accommodated. A stable operation may thus be attained in this way.

It will also be evident from comparison between FIGS. 3a and 3b that according to the present invention the leakage reactance X of the series transformer 303 is merely controlled by means of the compensating voltage $V_3$ to have an apparent value which is close to zero. This means that the leakage reactance X is essentially present between the two block systems. Therefore, when a fault occurs on one block system, the fault current which flows into the faulted system from the other sound block system may be readily restrained.

In short, the characteristic feature of the present invention resides in that both restraining functions for the accommodation of power and for fault current are provided essentially at the same time.

Figure 4:
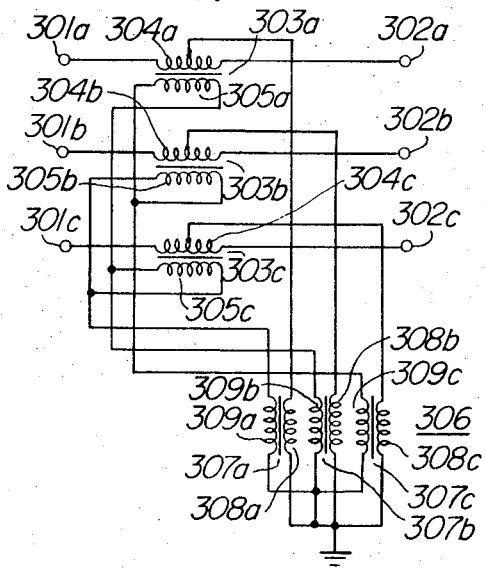
FIG. 4 is a connection diagram showing an embodiment of the present invention.

FIG. 4 is a circuit diagram showing a basic embodiment of the invention based on the above described concept. In the description to follow with reference to FIGS. 4 et sequence, those elements which are identical or equivalent with elements shown in FIGS. 2 and 3 are designated by the same reference numerals and characters a, b and c are added where it is pertinent to distinguish the three phases a, b and c from one another. As shown in the figure, the series transformers 303 are provided for each of the three phases a, b and c with their secondary windings 305a, 305b and 305c being delta-connected. Numeral 307 designates exciting transformers disposed to provide the compensating voltage source 306 shown in FIG. 2. Numerals 308 and 309 designate primary and secondary windings of the exciting transformers 307, respectively, having one end thereof connected in common with one another and grounded. The other ends of the primary windings 308a, 308b and 308c of the exciting transformers 307 are respectively connected to the center points of the primary windings 304a, 304b and 304c of the corresponding phases in the series transformers 303. That is, 308a is connected to the center point of 304a, 308b to that of 304b and 308c to that of 304c. It is not always necessary to connect the secondary windings of the exciting transformers 307 to the center points of the primary windings of the series transformers 303 and, for example, they may be connected to the terminals 301 or 302, although they should preferably be connected as shown in the illustrated embodiment. The reason for this is that the center point voltages of the series transformers may provide the required compensating voltages in the most effective way and these center points of the series transformers are the points which are least susceptible to the effects caused by any fault on the block systems. The other ends of the secondary windings 309a, 309b and 309c of the exciting transformers 307 are coupled to the junction points of the delta-connected secondary windings 305a, 305b and 305c of the series transformers 303 as shown in the figure. In other words, the difference voltage between the voltages induced in the secondary windings 309b and 309c is applied to the secondary winding 305a, and similarly the difference voltage between those of 309c and 309a is applied to 305b and the difference voltage between 309a and 309b to 305c. That is, since the secondary winding 305 of the series transformer is energized by the voltage which corresponds to the difference between the phase voltages of the other two phases, the compensating voltage $V_3$ is one which constitutes the quadrature component with respect to the phase voltages $V_1$ and $V_2$. Therefore, with the arrangement shown in FIG. 4 it is possible to achieve the results described in reference to FIGS. 2 and 3. Of course, the magnitude and polarity of voltage to energize the secondary winding 305 must be properly controlled according to the direction and amount of electric power to be accommodated between the block systems as will be explained hereinafter.

Figure 5:
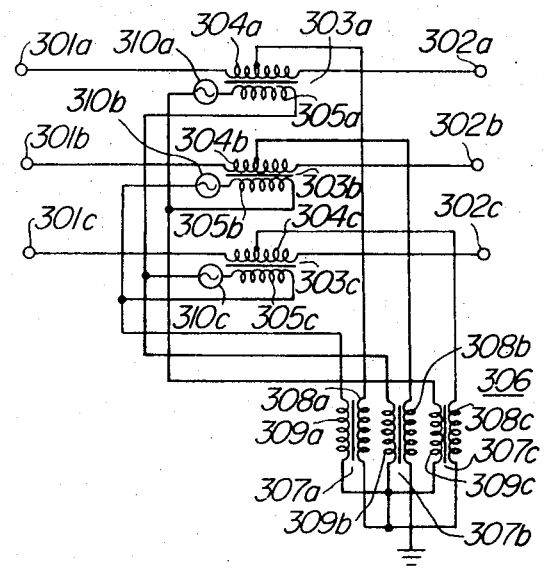
FIG. 5 is a connection diagram showing another embodiment of the present invention.
Figures 6A, 6B:
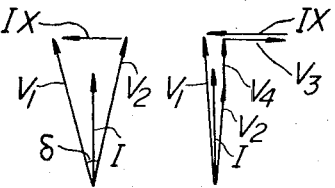
FIGS. 6a and 6b are vector diagrams for explaining the embodiment of FIG. 5.

FIG. 5 is a connection diagram showing another embodiment of the present invention. As will be seen from comparison between FIGS. 4 and 5, the embodiment of FIG. 5 is the same as that shown in FIG. 4 excepting that second compensating voltage sources 310 are provided. The second compensating voltage source 310 provides, as will be explained hereinafter, a voltage of the in-phase component with the respective phase voltages such that the load of block systems may be controlled through the control of this voltage to thereby facilitate the balancing of demand and supply in a block system in which the interruption of the power source has occurred. This fact will be further explained in conjunction with the vector diagrams shown in FIG. 6. FIGS. 6a and 6b are drawn correspondingly with the vector diagrams shown in FIGS. 3a and 3b. Since the second compensating voltage source 310 is in the same phase with the phase voltages as shown in FIG. 6b, if it is applied with a polarity designated at $V_4$ in the figure, the voltage $V_2$ of the block system 2 will be reduced by that amount. Although not shown in the figure, it will be seen that the application of the voltage $V_4$ with an inverse polarity will decrease the voltage $V_1$ of the block system 1. The load of the block system varies in proportion to 1.2 to 1.3 of the system voltage multiplied by itself, the load of the block system 2 will be decreased as its voltage $V_2$ is dropped by the second compensating voltage $V_4$. This is equivalent to the supply of a certain amount of electric power to supplement the interruption of the power source thus going far towards restoring the demand-supply balance of electric power. The generators of these bloc systems are naturally provided with automatic voltage regulators and the main transformers used in the systems are provided with an on-load voltage regulator such that by the time these devices begin to exhibit their effects, the voltage reducing effect of the second compensating voltage $V_4$ would have lost its practical value, thus necessitating the provision of any effective means for system control such as load shedding and the like that should be effected during this intervening time.

Figure 7A:
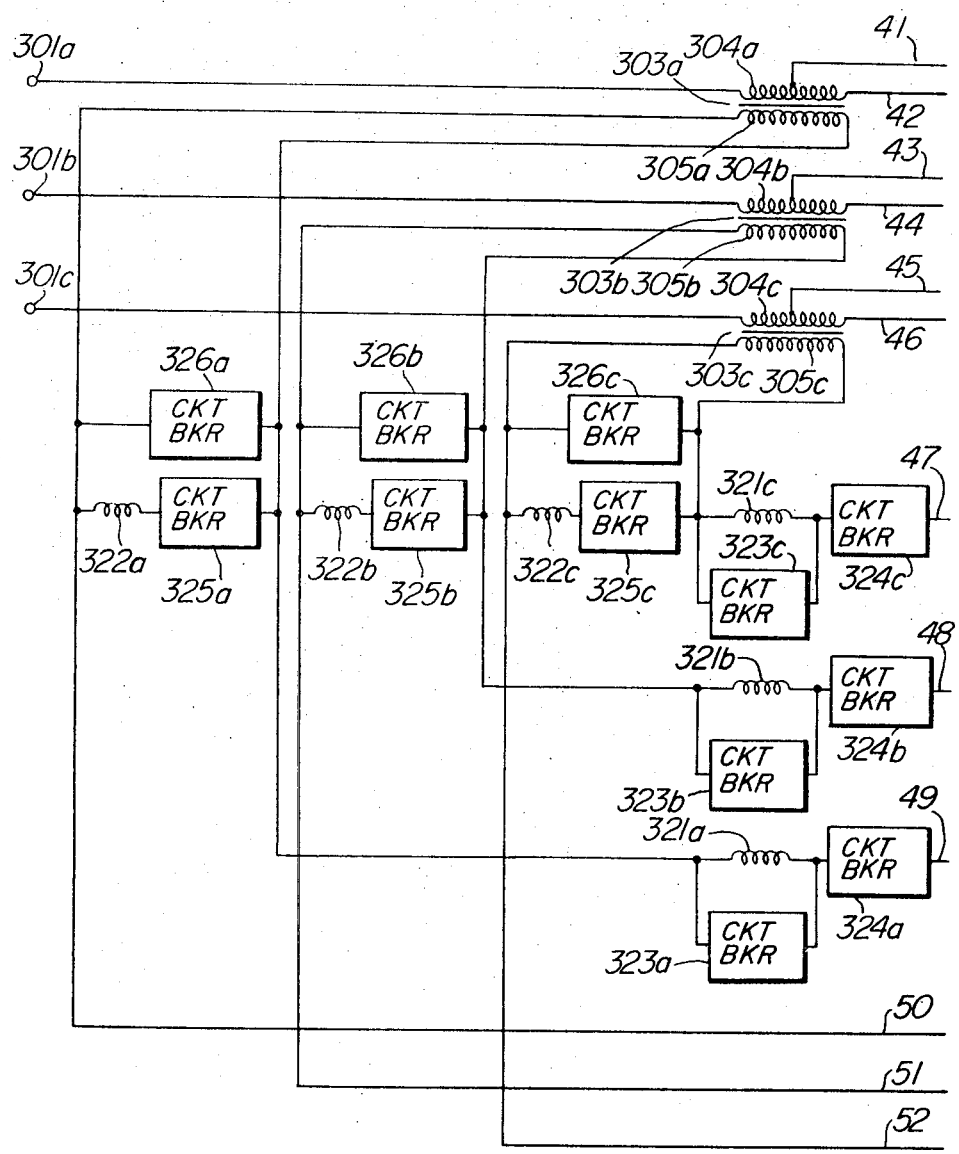
FIGS. 7a and 7b are connection diagrams showing a specific embodiment of the present invention.
Figure 7B:
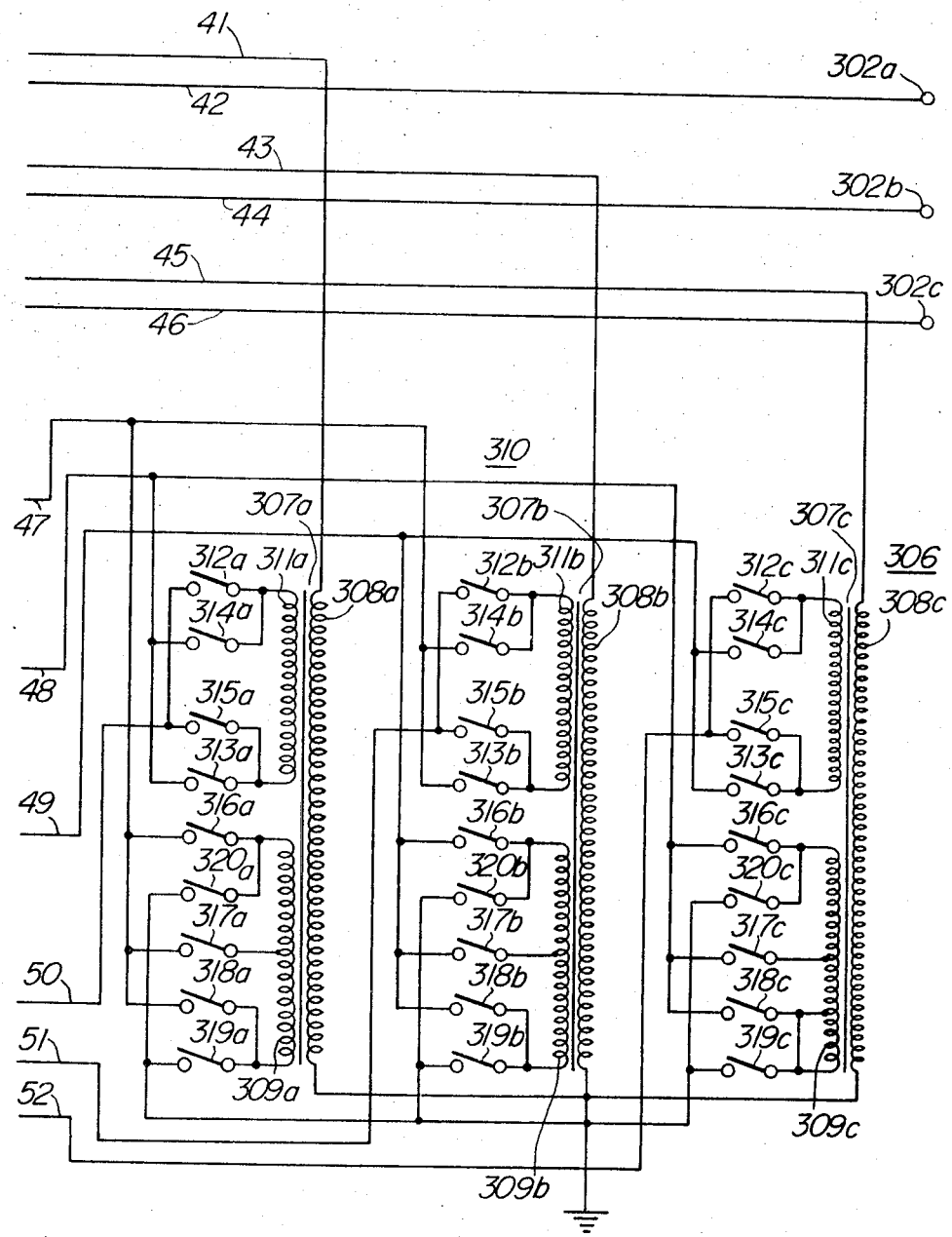
Figure 8:
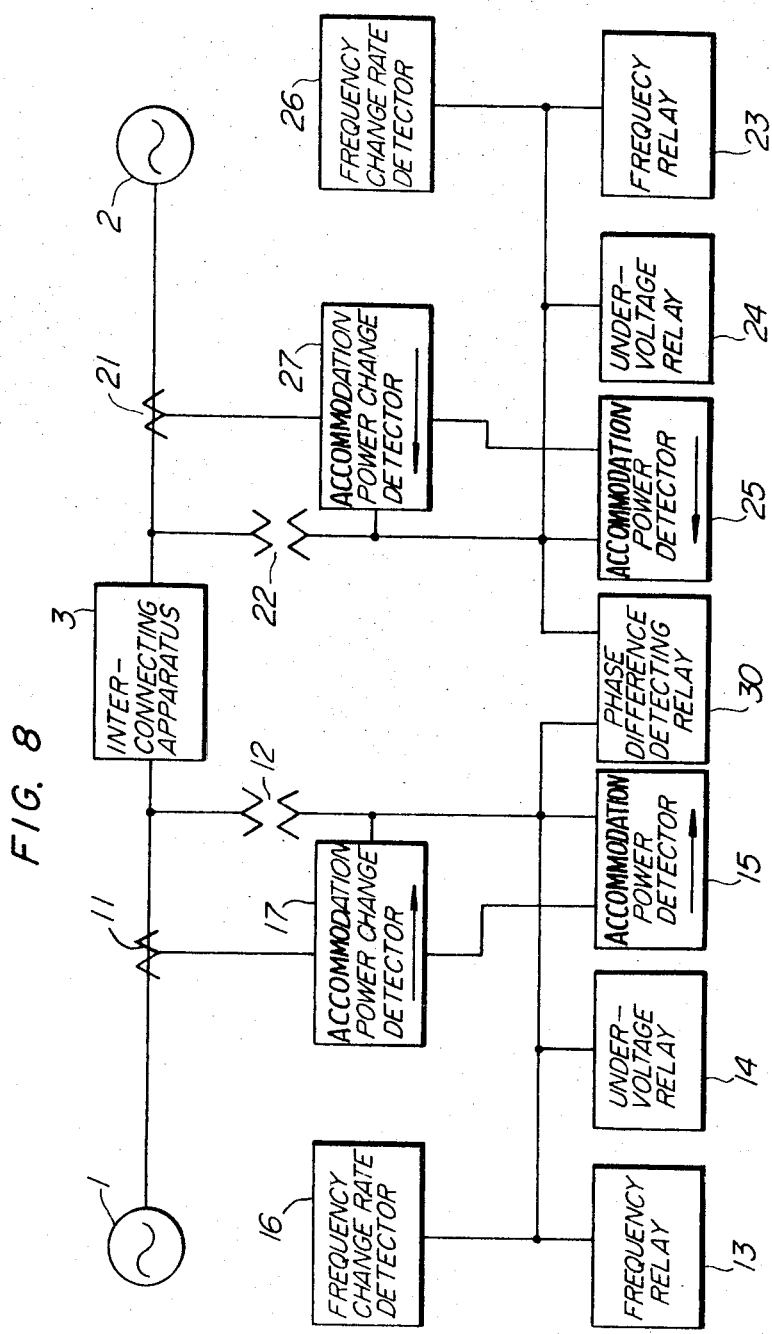
FIG. 8 is a block diagram for deriving control signals for controlling the embodiment of FIGS. 7a and 7b.

FIGS. 7a and 7b are connection diagrams showing a further embodiment of the present invention provided with an additional restraining function for the accommodation power. If lead wires 41, 42 . . . , 52 designated by the same reference numerals are connected, the device of FIGS. 7a and 7b will be completed. Numeral 311 designates a tertiary winding provided on an exciting transformer 307 with its induced voltage being used as the voltage $V_4$ of the second compensating voltage source designated at 310 in FIG. 5. Therefore, the tertiary windings 311a, 311b and 311c for the respective phases are connected such that relationships between the secondary windings 311a, 311b and 311c and the secondary windings 305a, 305b and 305c of the series transformers 303 are as show in FIG. 5. Numerals 312, 313 ..., 315 designate tap changers which are used to change the polarity of the second compensating voltages $V_4$ (the compensating voltages of the in-phase component). Numerals 316, 317, ..., 320 designate tap changers which are utilized for changing the value and polarity of the compensating voltage $V_3$ (the compensating voltages of the quadrature component which will be referred hereinafter simply as the first compensating voltages) which are explained in conjunction with FIGS. 2 and 4. Numeral 321 designate a current limiting reactor disposed to limit the flow of current at the time the taps are changed. Numeral 322 is a reactor adapted to limit the accommodation of electric power between block systems. Numeral 323, 324, ..., 326 designate circuit breakers adapted to be controlled to open or close at the time the tap changers operate as well as when the reactors 322 are connected or disconnected. The operations of these tap changers and the circuit breakers will be explained later. FIG. 8 is a block diagram for providing control signals required for controlling the embodiment of the present invention shown in FIGS. 7a and 7b. Numerals 11 and 21 designate current transformers adapted to carry the current which flows into the interconnecting apparatus 3 from either the block systems 1 or 2. Numerals 12 and 22 designate potential transformers which are adapted to provide the line voltage on the side of the block system 1 and that of the block system 2, respectively. Numerals 13 and 23 designate frequency relays adapted to respond to the frequency voltages system frequency) of the output each of the potential transformers 12 and 22 respectively and each is provided with three terminals adapted to the output, for example, when the system frequency drops below 48.5, 49 and 49.5 Hz. The relays 13, 23 may be of any configurations if the aforesaid requirements are met. Numerals 14 and 24 designate under-voltage relays adapted to respond to the output voltages of the potential transformers 12 and 22 respectively so that they produce outputs, for example, when the system voltages $V_1$ and $V_2$ drops to 90 percent of their predetermined values. These relays may also be of any configuration. Numerals 15 and 25 designate accommodation power detectors adapted to receive at the inputs thereof the outputs from the current transformers 11 and 21 and the potential transformers 12 an 22 and, only when electric power is accommodated in the directions shown by the arrows from the block system 1 to the block system 2 or vice versa, deliver outputs which correspond to the amount of the accommodation power. Detectors of any construction may be employed. Numerals 16 and 26 designate frequency change rate detectors which may be of any configuration provided that they are adapted to respond to the frequency (the system frequency) of the output voltages of the transformers 12 and 22 to deliver at a plurality of output terminals thereof such outputs as correspond to the change rate $df/dt$ (or $\Delta f/\Delta t$). Numeral 30 designates a phase difference (phase difference angle) detecting relay which may be also of any configuration provided that it is adapted to be energized by the output voltages of the transformers 12 and 22, responds to the phase difference $\delta$ between the voltages of the block system and is provided with two terminals adapted to deliver outputs, for example, when either the phase difference $\delta$ exceeds 90° or the $\delta$ decreases less than 5°, respectively. Numerals 17 and 27 designate accommodation power change detectors which may be on disclosed in the specification and the accompanying drawing of Japanese Patent application No. 68616/1966 or of any other configuration, provided that in the same manner as the accommodation power detectors 15 and 25, they are adapted to receive at the inputs thereof the outputs from the current transformers 11 and 21 and the transformers 12 and 22 and, only when electric power is accommodated in the directions shown by the arrows such as from the block systems 1 to 2 or vice versa and they produce outputs in response to those changes, or amounts or rates of the interchange power that exceed the predetermined values.

Figure 9:
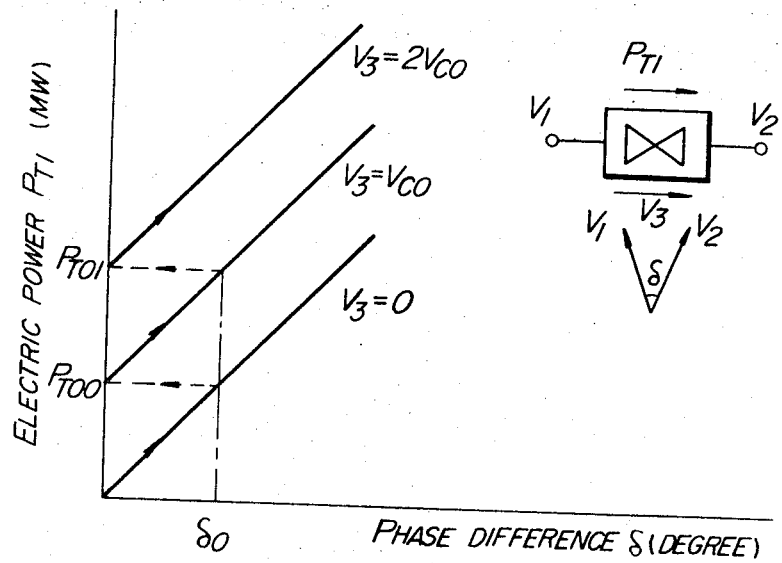
FIG. 9 is a graphic representation of the relationship between the accommodation power passing through the interconnecting apparatus and the phase difference angle between the voltages of the respective block systems.

FIG. 9 is a graphical representation showing the relationships between the accommodation power $P_{T1}$ passing through the interconnecting apparatus and the phase difference $\delta$ between the voltages of the block systems utilizing the first compensating voltage $V_3$ a a parameter. As will be apparent from the figure, the phase difference $\delta$ correspondingly increases with the increase in the electric power $P_{T1}$ substantially in a straight-line manner (more strictly, it increases in proportion to sine curve sin $\delta$). Where the first compensating voltage has been changed from $V_3 = 0$ to $V_3 = V_{co}$ when $P_{T1} = P_{T00}$, the phase difference also changes from $\delta = \delta_0$ to $\delta = 0$. If the voltage has been controlled from $V_3 = V_{co}$ to $V_3 = 2V_{co}$ when $P_{T1} = P_{T01}$, the phase difference also changes from $\delta = \delta_0$ to $\delta = 0$. In other words, by suitably changing the tap changers 316, 317, ..., 320 when the outputs of the accommodation power detectors 15 and 25 have attained $P_{T00}$ and $P_{T01}$ respectively, the phase difference may be made as small as shown in the vector diagram of FIG. 3b. Thus, according to the present invention the phase difference between the two block systems will never exceed $\delta_0$ (10°, for example) at all times.

Figure 10:
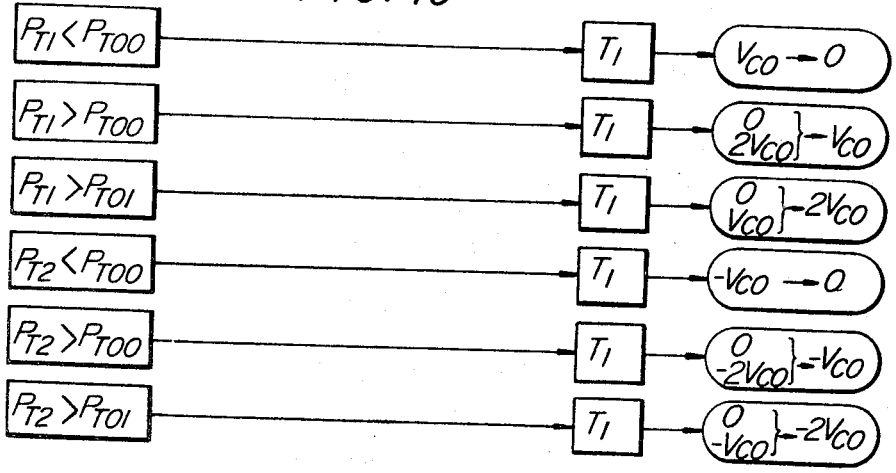
FIG. 10 is a flow diagram showing the control of the accommodation power.

FIG. 10 is control flow diagram which satisfies the relationships shown in FIG. 9. In other words, as the outputs $P_{T1}$ and $P_{T2}$ of the electric power detectors 15 and 25 when the accommodation power has changed remain in excess of $P_{T00}$ and $P_{T01}$ respectively over a time $T_1$, the first compensating voltage $V_3$ is changed from 0 to $\pm V_{co}$ or from $\pm V_{co}$ to $\pm 2V_{co}$. In contrast, the voltage $V_3$ is changed from $\pm 2V_{co}$ to $\pm V_{co}$ when the outputs $P_{T1}$ and $P_{T2}$ have decreased from over $P_{T01}$ to over $P_{T00}$ and remained as such in excess of the time $T_1$. Here the time $T_1$ refers to the confirmation time needed to avoid any unwanted changing operations due to instantaneous variations in electric power and 10 to 60 seconds may be regarded as appropriate values in consideration of the system construction and others factors. Various control operations of FIG. 11 may also be executed with corresponding confirmation time based on this concept. Or course, it is possible that the outputs $P_{T1}$ and $P_{T2}$ increase in a relatively short period of time so that two control operations must be carried out simultaneously. In this case, a control sequence should be adopted wherein higher priority control operation is the first to be executed. On the other hand, the first compensating voltage $V_3$ will be reduced to zero if the outputs $P_{T1}$ and $P_{T2}$ to be less than $P_{T00}$ in excess of the time $T_1$.

In the embodiment shown in FIGS. 7a and 7b, for example, the changing operations of compensating voltage described above will cause the tap changers 316, 317, ..., 320 to operate in this way. That is, both tap changers 318 and 319 are closed simultaneously in order that $V_3 = 0$. Similarly, corresponding tap changers 317 and 319 for $V_3 = V_{co}$, 319 and 316 for $V_3 = 2V_{co}$, 320 and 317 for $V_3 = -V_{co}$, and 320 and 318 for $V_3 = -2V_{co}$ may be simultaneously closed, respectively. Under normal conditions of operation, both the circuit breakers 323 and 324 are being closed and 325 and 326 are both in their open positions. When preset conditions are detected, thus calling for tap changing operations, the taps may be changed in the following order, that is, the predetermined conditions are detected — circuit breaker 323 is opened — circuit breaker 326 is closed — circuit breaker 324 is opened — taps are change — circuit breaker 324 is closed — circuit breaker is 326 opened — circuit breaker 323 is closed. In this sequence of operations, the taps may be changed with no current flowing and at the same time the effects on the systems due to the tap changing operation may be reduced. This tap changing operation may be complete in about 0.5 seconds.

Under the conditions wherein control is effected by means of the first compensating voltage only, that is, under the conditions shown by the vector diagrams of FIGS. 3and 3b, the second compensating voltage from the tertiary winding 311 of the exciting transformer 307 is not required so that the taps 313 and 315 are both closed and only the first compensating voltage is applied to the secondary winding 305 of the series transformer 303.

Figure 11:
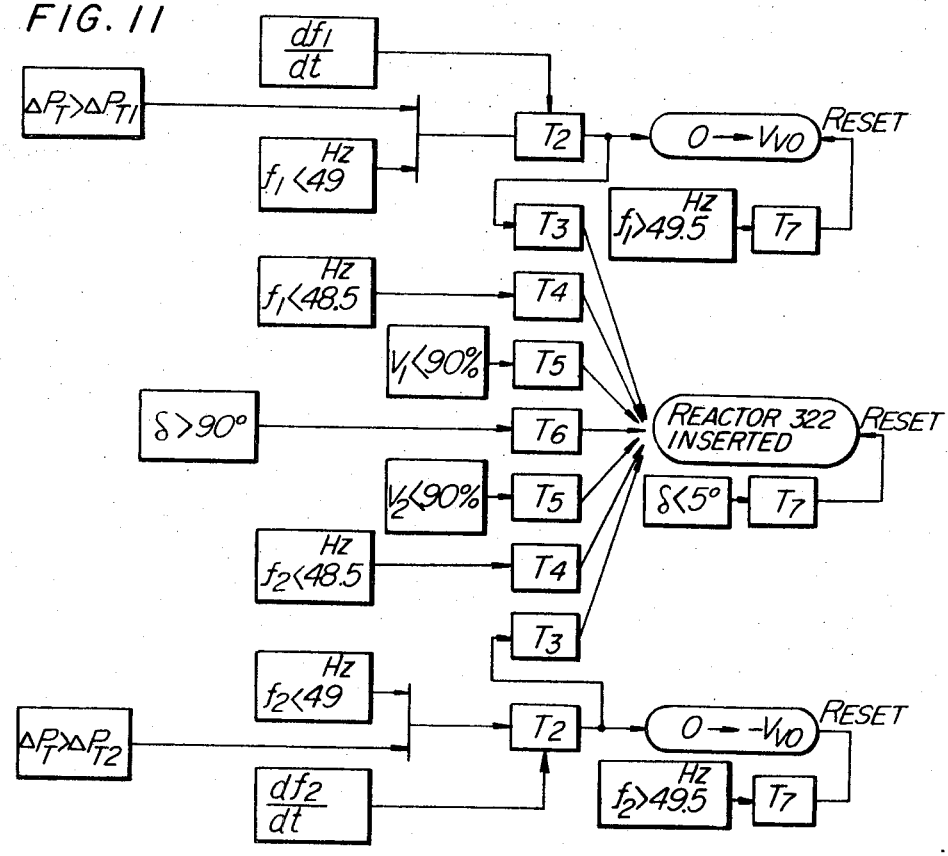
FIG. 11 is a control flow chart showing the accommodation power limitation and the supplementary reactor control.

FIG. 11 is a flow diagram of the control operations such as the control of accommodation power shown in the vector diagrams of FIGS. 6a and 6b and further the restraining of the accommodation power. The second compensating voltage $V_4$ is changed from 0 to $\pm V_{vo}$ when the output $\Delta P_T$ of the accommodation power change detectors 17 and 27 has exceeded the predetermined values $\Delta P_{T1}$ an $\Delta_{T2}$, the system frequency of the respective block systems has dropped below 49 Hz, for example, and both of these phenomena have lasted over a time $T_2$. In order that $V_4 = V_{vo}$, the voltage of the block system 2 will be depressed. Contrary, in order that $V_4 = -V_{vo}$, the voltage of the block system 1 will be depressed. The insertion or detachment and the polarity reversing of this second compensating voltage $V_4$ in the embodiment of FIGS. 7a and 7b, for example, cause the tap changers 312, 313, ..., 315 to operate in the manner to be explained hereinafter. That is, in order that $V_4 = 0$, the tap changers 313 and 315 will be closed simultaneously. Similarly, in order that $V_4 = V_{vo}$ or $V_4 = -V_{vo}$, either changers 313 and 312 or 314 and 315 will be closed simultaneously. Of course, it must be considered so that apart from the fact that the tap changers are different, the second compensating voltage may be changed with no current flowing in the same sequence of operations as the first compensating voltage thereby not allowing any effects on the block systems.

When the second compensating voltage $V_4 = V_{vo}$ or $V_4 = -V_{vo}$ and the first compensating voltage $V_3$ is at a certain value, the embodiment of FIGS. 7a and 7b will be in the same configuration as the embodiment shown in FIG. 5.

The confirmation time $T_2$ for controlling the insertion or detaching of the second compensating voltage $V_4$ need not be fixedly determined by the construction of the systems. On the contrary, it may be such that it changes within the range from 1 to 10 seconds according to the outputs $df_1/dt$ and $df_2/dt$ of the frequency change rate detectors 16 and 26. In other words, if the frequency changes (drops) rapidly, a faster control is effected, and a longer confirmation time is employed for the controlling purpose if the change of frequency is relatively moderate.

The controlling operation to limit the accommodation power through the insertion of the reactor 322 will be explained in conjunction with the embodiment of FIGS. 7a and 7b. It is under so-called abnormal conditions that the reactor 322 is inserted to limit the accommodation power and its insertion will be effected entirely independent of the first and second compensating voltages in the sequence of operations, that is, the predetermined conditions are detected — circuit breaker 325 is closed — circuit breaker 324 is opened. One example of such predetermined conditions that call for the insertion of a reactor will be apparent from the control flow diagram shown in FIG. 11 as is the case with the control of the second compensating voltage $V_4$. To begin with, the reactor will be inserted where the second compensating voltage has been inserted and this condition has remained in excess of a time $T_3$. In other words, when such conditions happen, mere depression of the system voltages can no longer ensure the stabilized continuous operation of both block systems, thus calling for the insertion of the reactor 322 to limit the accommodation power so that the sound block system may continue its stable operation. 5 to 10 seconds, for example, should be appropriate values for the time $T_3$. Secondly, the reactor will be inserted if the frequency of the block systems has dropped below 48.5 Hz, for example, and has continued so in excess of a time $T_4$; if the voltages of the block systems have dropped below 90 percent and have remained so for more than a time $T_5$; and if the phase difference between the voltages of the two block systems has become more than 90° and has remained so over a time $T_6$. All of these second examples indicate situations which may arise when a comparatively large scale fault occurs and in this case it is necessary to insert the reactor within a short period to ensure that the sound block system may continue its operation with stability. In particular, $\delta > 90°$ indicates quite abnormal conditions requiring urgent attention and therefore values for the confirmation time $T_4$ should be 3 to 5 seconds; 10 to 30 seconds for the time $T_5$; and 0.1 to 0.2 seconds for the time $T_6$.

As described above, the accommodation of electric power may be made freely under normal conditions, whereas the controlling as well as the restraining function of accommodation power may be permitted to take effect instantaneously upon occurrence of abnormal conditions such as a fault and the like. If the inserted second compensating voltage $V_4$ or the reactor 322 is no longer needed such as, for example, when the system frequency has returned to 49.5 Hz or the phase difference $\delta$ has recovered to less than 5°, they should be reset.

In order to effect the controlling operations of FIGS. 10 and 11, a sequential control circuit comprising various timers, auxiliary relays and others connected in predetermined relationships will be required in addition to the output signals of those detectors shown in FIG. 8. However, since such circuits may be easily devised by those skilled in the art from the showings of FIGS. 10 and 11, any specific example of the circuit will be omitted here. In this connection if the conditions for the insertion of the first and second compensating voltages or the reactor 322 could be established at the same time, priority may be advantageously given to the control so that the control by the reactor 322 has the highest priority, the control by the second compensating voltage has the second highest priority and the priority of the control by the first compensating voltage is the lowest. In this way, unwanted confusion in the controlling operations may be avoided.

What is claimed is:

1. An apparatus to be interconnected between two electrical power systems, each of which has at least one independent power source, comprising:

a series transformer having a primary winding connected between said power systems, and a secondary winding an exciting transformer having a primary winding connected between the midpoint of the primary winding of said series transformer and ground, a secondary winding for producing first compensating voltage, and a tertiary winding for producing a second compensating voltage, the two end terminals of the said secondary winding of the said exciting transformer being interchangeably connected with ground;

a supplementary reactor being selectively connected in series with said secondary winding of said series transformer through a first circuit breaker;

a first tap changer means for changing the first compensating voltage value and interchanging a ground connection between the two end terminals of said secondary winding of the said exciting transformer;

a second tap changer means connected to the said tertiary winding for changing the polarity of said second compensating voltage;

a current limiting reactor means connected to the secondary winding of said series transformer for limiting the current that flows thereto upon operation of said first and second tap changers; and means comprising second, third and fourth circuit breakers connected to said tap changers for controlling the connection of said exciting transformer to said current limiting reactor when operating said first and second tap changers.

2. An apparatus as defined in claim 1 including means for effecting operation of said first and second tap changers after predetermined power conditions have been detected and predetermined confirmation time has elapsed.

3. An apparatus as defined in claim 1 including means for controlling first compensating voltage in response to the amount of transfer power between said power systems.

4. An apparatus as defined in claim 1 including means for controlling said second compensating voltage in accordance with the change of transfer power between said power systems and the frequency thereof.

5. An apparatus as defined in claim 2 including means for effecting control of said second compensating voltage in accordance with the confirmation time which is varied by the rate of frequency change of said power systems.

6. An apparatus as defined in claim 1 including control means for controlling operation of said supplementary reactor in accordance with the frequency and voltage of said power systems and the phase difference therebetween.

7. An apparatus as define in claim 6 including means for removing said second compensating voltage after a predetermined confirmation time when the frequency of said system has recovered to a predetermine value.

8. An apparatus as defined in claim 6 including means for removing said supplementary reactor in accordance with the predetermined confirmation time when said phase difference between said power systems has recovered to a level less than a predetermine value.

9. An apparatus interconnected between two power systems, each of which has at least one independent power source, comprising a series transformer having a primary winding interconnected between said power systems and a secondary winding being energized by a first compensating voltage which has a quadrature component with the phase voltage of said power systems to be produced from a secondary winding of an exciting transformer, the primary winding of said exciting transformer is connected to the primary winding of the said series transformer (being) to be supplied with the line voltage of said power systems and both terminals of said secondary winding of said exciting transformer being interchangeably connected through tap changer means to a ground potential and the secondary winding of the said series transformer thereby to change the polarity of said first compensating voltage, characterized in that supplementary reactor means is selectively connected through a circuit breaker means in series (for selective connection) with said secondary winding of the said series transformer (in the response to a condition).

10. A apparatus interconnected between two electrical power systems, each of which has at least one independent power source, characterized in that said apparatus comprises a reactor device having a significant reactance for limiting the current therethrough when either one of said two power systems is subjected to a fault, and means for applying a first compensating voltage to said reactor device having a polarity and voltage value sufficient to cancel the normal voltage drop developed across said reactor device, thereby to reduce the apparent reactance of said apparatus during normal operation, comprising supplementary reactor means to substantially disconnect the power transmission between said power systems and capable of being connected to said reactor device for selectively increasing the reactance of said reactor device, and control means for connecting said supplementary reactor means to said reactor device.

* * * * *